No. 744,589. PATENTED NOV. 17, 1903.
F. A. MOORE.
HOSE COUPLING.
APPLICATION FILED APR. 22, 1903.
NO MODEL.

Witnesses:

Inventor,
Frank A. Moore.

No. 744,589. Patented November 17, 1903.

UNITED STATES PATENT OFFICE.

FRANK A. MOORE, OF GAREE, PENNSYLVANIA.

HOSE-COUPLING.

SPECIFICATION forming part of Letters Patent No. 744,589, dated November 17, 1903.

Application filed April 22, 1903. Serial No. 153,827. (No model.)

*To all whom it may concern:*

Be it known that I, FRANK A. MOORE, a citizen of the United States of America, residing at Garee, in the county of Clearfield and State of Pennsylvania, have invented certain new and useful Improvements in Hose-Couplers, of which the following is a specification, reference being had therein to the accompanying drawings.
This invention relates to certain new and useful improvements in hose-couplings, and the object of the invention is to construct a hose-coupling which may be quickly, easily, and effectually joined together without the employment of the ordinary screw-threads.

A further object of the present invention is to provide means for automatically locking the sections after they have been coupled together, which means is readily accessible to permit the unlocking of the sections or members when desired.

Figure 1:
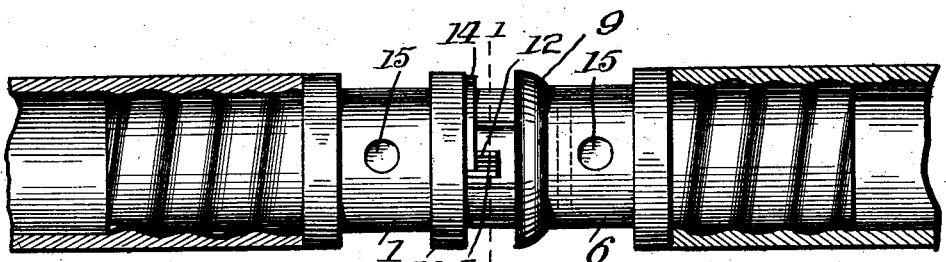
Figures 2, 3, 4:
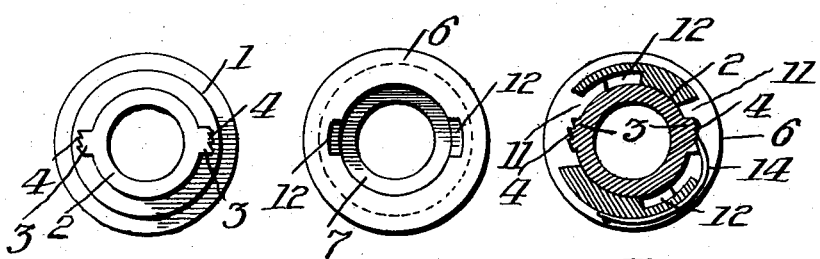
Figure 5:
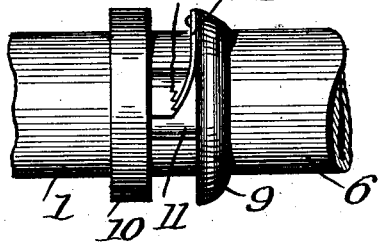
Figure 6:
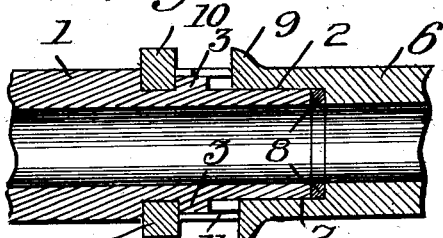

Briefly described, the invention comprises a male and female member or section, the one provided with a recess to receive the extension carried by the other section or member. One of the sections or members is provided with openings cut therethrough near its engaging end and also has oppositely-disposed recesses or grooves leading into these openings, which recesses or grooves receive oppositely-disposed lugs on the other member or section adapted to enter the recesses or cut-away portions of the engaging section and interlock. These lugs are provided with teeth whereby to be engaged by the spring member carried by the opposite section for holding the two sections or members in the locked position, all of which construction will be hereinafter more fully described.
In describing the invention in detail reference is had to the accompanying drawings, forming a part of this specification, and wherein like numerals of reference indicate like parts throughout the several views, in which—
Figure 1 is a top plan view of my improved hose-coupling, showing the members or sections in the coupled position with the hose secured thereon and shown in horizontal section. Fig. 2 is a detail end view of the male member or section. Fig. 3 is a like view of the female member or section. Fig. 4 is a transverse vertical sectional view of the sections or members after coupled together, taken on the line 1 1 of Fig. 1. Fig. 5 is a top plan view of the sections or members coupled together and partly broken away, showing the modified form of locking means. Fig. 6 is a longitudinal sectional view of the members or sections coupled together and partly broken away.

To put my invention into practice, I provide a male member or section 1, provided with a tubular extension 2, having oppositely-disposed interlocking lugs 3, which lugs may be provided on their outer face with teeth 4, as seen in Figs. 1, 2, 4, and 6, or with teeth 5 on their outer edge, as seen in Fig. 5. The female member 6 is provided with an annular recess 7 to receive the extension 2, a gasket 8 being placed against the inner wall of said recess to receive the inner end of said extension 2. This female member is constructed with annular peripheral flanges 9 10, and made through the said member 6 between these two flanges on opposite sides of the member are openings 11. The lugs 3 are adapted to enter into these openings and turn against the inner edge of the flange 10 through the medium of grooves or recesses 12 made in the inner circumference of the female member at the outer end thereof. A spring member 14 is permanently attached to the female member 6, as seen in Fig. 4, whereby to engage with teeth 4 on the outer face of the lugs 3, or this spring member may be attached to the flange 9, as seen in Fig. 3, whereby to engage with the teeth 5 on the outer edge of the lugs. It will thus be seen that these lugs may be constructed with the teeth on the outer face or on the outer edge, as may be desired, a spring locking member being placed accordingly. I preferably provide each of the members with recesses 15, as shown in Fig. 1, whereby to receive the ordinary spanner-wrench, if found desirable to use same.

To couple the members, the oppositely-disposed lugs 3 are inserted in the grooves or recesses 12 and one of the members is given a quarter-turn, or both the members may be rotated in opposite directions, whereby to turn the lugs 3 into the openings 11 and lock the inner edge of these lugs against the inner edge of the annular flange 10 of the female member. By providing the teeth on each of the lugs 3 it will be observed that it is immaterial as to how the members are connected—that is, it will not require the insertion of a particular lug 3 into a particular recess 12, as the spring member will engage with either one of the lugs. The coupling constructed in accordance with this principle is easily and quickly made, and when the members or sections are joined together the coupling is rigid and effective.

While I have shown and described my invention in detail as it is practiced by me, yet it will be noted that various slight changes may be made in the details of construction without departing from the general spirit of my invention.

Having fully described my invention, what I claim as new, and desire to secure by Letters Patent, is—

In a hose-coupling, a male member provided with a reduced tubular extension, lugs having their outer faces toothed carried thereby, a female member provided with annular peripheral flanges, and having openings formed therein between the said flanges on opposite sides of the said member, the female member being further provided with oppositely-disposed longitudinal grooves formed in its inner circumference communicating with the first-named openings, the lugs of the male member being adapted to be guided by the grooves into said openings and turned into engagement with the inner edge of one of said flanges, and means for locking the lugs in engagement with said flange to lock the coupling, substantially as described.

In testimony whereof I affix my signature in the presence of two witnesses.

FRANK A. MOORE.

Witnesses:
J. F. FOLTZ,
J. M. STEPHENSON.